United States Patent
Le Goff (10) Patent No.: US 7,570,694 B2
(45) Date of Patent: Aug. 4, 2009

(54) BACKWARD COMPATIBLE MULTI-CARRIER TRANSMISSION SYSTEM

(75) Inventor: David Le Goff, Tinteniac (FR)

(73) Assignee: NXP B.V., Eindhoven (NL)

( * ) Notice: Subject to any disclaimer, the term of this patent is extended or adjusted under 35 U.S.C. 154(b) by 546 days.

(21) Appl. No.: 10/568,643

(22) PCT Filed: Aug. 11, 2004

(86) PCT No.: PCT/IB2004/002613

§ 371 (c)(1),
(2), (4) Date: Feb. 16, 2006

(87) PCT Pub. No.: WO2005/020529

PCT Pub. Date: Mar. 3, 2005

(65) Prior Publication Data

US 2006/0193244 A1    Aug. 31, 2006

(30) Foreign Application Priority Data

Aug. 22, 2003 (EP) .................................. 03300093

(51) Int. Cl.
*H04K 1/10* (2006.01)
*H04L 27/28* (2006.01)

(52) U.S. Cl. .................. 375/260; 375/240.01; 375/261; 375/264; 375/279; 375/298; 348/388.1

(58) Field of Classification Search ................. 375/260, 375/240, 240.01, 261, 264, 279, 298, 308, 375/324, 329; 348/388.1
See application file for complete search history.

(56) References Cited

U.S. PATENT DOCUMENTS 5,467,132 A * 11/1995 Fazel et al. ............ 375/240.01

* cited by examiner

*Primary Examiner*—Phuong Phu (57) ABSTRACT

The transmission system is backward compatible with a former transmission system (DVB-T), enabling a receiver of the former system to receive signals transmitted by a transmitter of the new transmission system. A new modulation is used to transmit additional information bits corresponding to a new service. The new modulation is specified by a combination of the former modulation with a new-built over modulation.

11 Claims, 6 Drawing Sheets

BACKWARD COMPATIBLE MULTI-CARRIER TRANSMISSION SYSTEM

FIELD OF THE INVENTION

The invention generally relates to digital transmissions. It particularly relates to a new transmission system using a new modulation scheme for transmitting additional information signals over a transmission medium, which is backward compatible with a former transmission system using a former modulation scheme to transmit former information signals over the same transmission medium.

The invention applies to digital transmission systems, and particularly to broadcasting systems for digital television according to the DVB-T (Digital Video Broadcasting-Terrestrial) recommendation.

BACKGROUND OF THE INVENTION

The International patent application number PCT/IB/03/01544 filed on the 11$^{th}$ of Apr. 2003 with a priority date on 30, Apr. 2002 by Koninklijke Philips Electronics describes a new transmission system of the type mentioned in the opening paragraph. It enables a receiver of the former system to receive signals transmitted by the new transmission system. A drawback of this system is that the new modulation scheme adds noise to the signals received by the receivers of the former transmission system, which may disturb the receivers.

OBJECT AND SUMMARY OF THE INVENTION

It is an object of the invention to provide an improved transmission system, which allows transmitting additional information over a transmission signal of a former transmission system, which is backward compatible with the former transmission system and which yields a better quality.

This is achieved by a multi-carrier transmission system for transmitting information signals over a set of carriers, the set of carriers comprising a sub-set of carriers, denoted sub-carriers, each sub-carrier being modulated according to a first modulation comprising complex symbols of a first constellation, the real parts of which being proportional to a combination of the real parts of complex symbols of a second constellation, which convey additional information signals, with the real parts of complex symbols of a third constellation, which convey parameter signaling signals, the complex parts of the symbols of the first modulation being proportional to a combination of the complex parts of the symbols of the second constellation.

According to the invention, the new-built transmission signals convey the former information signals over a main set of carriers and the additional information signals are embedded into parameter signaling signals, which are transmitted separately from the former information signals over a sub-set of the main set of carriers. The new-built transmission signals are transmitted with a (first) modulation, which is a predetermined combination of an (second) over-modulation destined to modulate the additional information signals with a known (third) modulation, which is used to modulate parameter signaling signals. Reception and demodulation of the new-built transmission signals by the receivers of the former transmission system is rendered possible because the (second) over-modulation is added over the (third) modulation of the sub-carriers without disturbing the demodulation of the latter (third) modulation by the receivers of the former system. A receiver of the former system can then receive and demodulate the former information signals and the parameter signaling signals transmitted by the new system as they did with the former system without having any knowledge of the additional information signals, which are embedded in the new built transmission signals.

According to a preferred embodiment of the invention, a new transmission system is provided wherein said third (TPS) modulation is of the type of the Differential Binary Phase Shift Keying (DBPSK) modulation whereby the transmitted bit is determined by the change of the transmitted symbol of the differential modulation, and wherein the symbols of the second (over) modulation are predetermined so that any couple of symbols in the second constellation makes an angle, which is smaller than 90 degrees. This advantageously allows that the receivers of the former transmission system are not disturbed by the reception of signals of the new transmission system because the symbols of the second modulation are predetermined so that they don't disturb the demodulation of the former transmission signals.

A transmission device, a reception device, a transmission method, a computer program product for a device computing a set of instructions, which when loaded into the device, causes the device to carry out the method and a transmission signal are also described according to the invention.

BRIEF DESCRIPTION OF THE DRAWINGS

The invention and additional features, which may be optionally used to implement the invention, are apparent from and will be elucidated with reference to the drawings described hereinafter, wherein which.

DETAILED DESCRIPTION OF THE DRAWINGS

The following remarks relate to reference signs. Like letter references in different Figures designate like entities.

Figure 1:
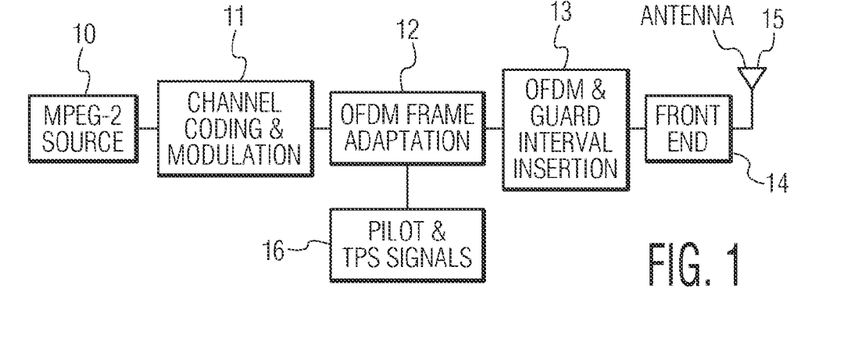
FIG. 1 is a schematic block diagram illustrating a transmission chain according to the DVB-T transmission system.

FIG. 1 is a functional block diagram representing the transmission chain of a DVB-T system within which the invention can be used. In all the description, the DVB-T system is used as an example but the invention applies to any other digital transmission system. The transmission chain in plain lines comprises:

- an MPEG-2 source 10 for transmitting digital data (transport stream),
- a channel coding and modulation block 11,
- an OFDM frame adaptation block 12,
- and OFDM and guard interval insertion block 13 to transform the signal from the frequency domain into the time domain,
- a front end block 14 for performing digital to analog conversion and power transmission to the antenna 15 and
- a pilot and TPS signals blocks 16 for inserting the pilot and TPS carriers into the main DVB-T stream.

Within the DVB-T standard, 2 modes of operation are defined. The "2K mode" is suitable for single transmitter operation and for small SFN (Single Frequency Network) networks with limited transmission distances. The "8K mode" is suitable both for single transmitter operation and for small and large SFN networks.

The DVB-T system uses OFDM (Orthogonal Frequency Division Multiplex) transmission. All data carriers in one OFDM frame are modulated using either QPSK, 16-QAM, 64-QAM, or non-uniform 64-QAM constellations. The constellations and the details of the Gray mapping applied to them are illustrated in the FIG. 9, paragraph 4.3.5 of the ETSI EN 300 744 recommendation, the whole cited recommendation being incorporated herein by reference.

The transmitted signal is organized in frames. Each frame consists of 68 OFDM symbols. Each symbol is constituted by a set of K=6817 carriers in the 8K mode and K=1705 carriers in the 2K mode. In addition to the transmitted data, an OFDM frame contains pilot carriers and TPS (Transmission Parameter Signaling) carriers. The pilots can be used for frame synchronization, frequency synchronization, channel estimation, transmission mode identification. The pilots are modulated according to a reference sequence corresponding to their respective carrier index. This reference sequence also governs the starting phase of the TPS information.

The TPS carriers are used for the purpose of signaling parameters related to the transmission chain, that is, to channel coding and modulation. The TPS is transmitted in parallel on 17 TPS carriers for the 2K mode and on 68 TPS carriers for the 8K mode. Every TPS carrier in the same symbol conveys the same differentially encoded information bit. The TPS is defined over 68 consecutive OFDM symbols, referred to as one OFDM frame. Each OFDM symbol conveys one TPS bit. Each TPS block (corresponding to one OFDM frame) contains 68 bits defined as follows: 1 initialization bit, 16 synchronization bits, 37 information bits and 14 redundancy bits for error protection. Of the 37 information bits, 31 are used at present and 6 are reserved for future use, and should be set to zero. The reference sequence corresponding to the TPS carriers of the first symbol of each OFDM frame is used to initialize the TPS modulation on each TPS carrier. Every TPS carrier is DBPSK modulated and conveys the same message. The DBPSK is initialized at the beginning of each TPS block (of 68 bits). In a DBPSK modulation, the change of sign from one symbol to the following symbol carries the information bit.

Figure 2:
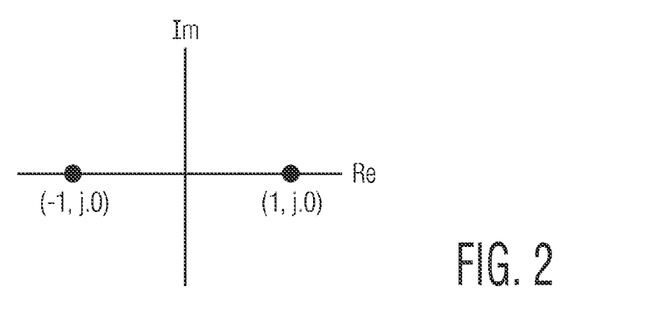
FIG. 2 is a schematic diagram illustrating the mapping of the differential modulation of sub-carriers of the DVB-T transmission system.

FIG. 2 shows the mapping of the differential DBPSK modulation of the TPS for each OFDM symbol of an OFDM carrier. The following rule applies.

If $S_l=0$ then $Re\{C_l\}=Re\{C_{l-1}\}$; $Im\{C_l\}=0$
If $S_l=1$ then $Re\{C_l\}=-Re\{C_{l-1}\}$; $Im\{C_l\}=0$ with l is the index of the OFDM symbol, $S_l$ is the transmitted TPS bit and $C_l$ is the complex TPS symbol. The TPS symbols are represented by two points in FIG. 2, which illustrate the two points of the DBPSK constellation.

A preferred embodiment of the invention is described herein after for allowing to transmit a new service containing additional information within the DVB-T signal, using the TPS signal to carry this additional information without disturbing existing receivers. In accordance with this embodiment, which applies to the DVB-T system, a coherent "over-modulation" (hierarchical modulation) having a constellation of points which meet predetermined criteria is added over the DBPSK symbols of the TPS on a carrier-by-carrier basis. The over-modulation contains the additional information bits corresponding to the new service. The sign of the real part of the new constellation contains the TPS signal. In order not to disturb the differential demodulation of the TPS signals, the angle between any two points of the constellation must be strictly smaller than 90 degrees. This avoids the jamming of the DBPSK modulation of the TPS signals by the new service. The smaller the angle, the more limited the jamming.

In accordance with the preferred embodiment, all TPS carriers are used for transmitting the additional information signal. According to an alternative embodiment, only part of the sub-carriers is used. This includes using only carriers having the same indexes in the sub-set of carriers or using carriers whose indexes vary with time. In accordance with another embodiment, robustness of the system can be improved to the detriment of the bit rate by adding redundancy in the additional information. This is obtained by copying the same bits over several symbols of the sub-carriers (as for the regular TPS symbols defined in the cited recommendation).

Figure 3:
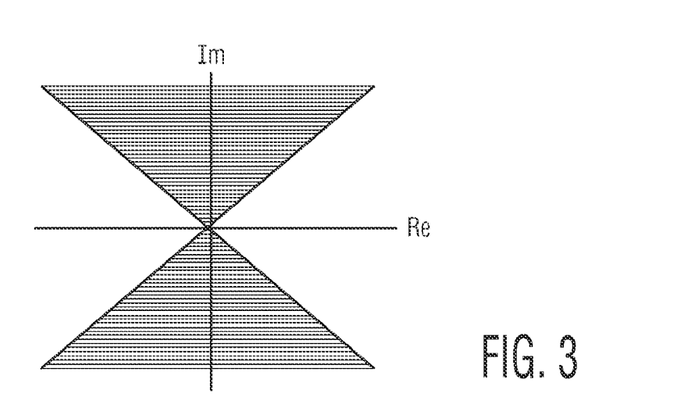
FIG. 3 is a schematic diagram illustrating possible locations for the points of a constellation for an over-modulation according to a preferred embodiment of the invention.

FIG. 3 shows possible locations for the points of the new constellation of the new hierarchical over modulation of the TPS signals that contain the new service. The points of the constellation can be located in the sector where their arguments are smaller than 45 degrees. These sectors are indicated in white, while the unsuitable locations correspond to the hatched area.

Figure 4A:
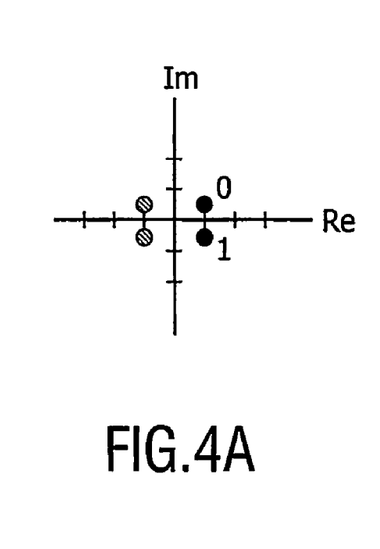
FIG. 4A to FIG. 4C are schematic diagrams illustrating three alternative constellations, denoted A, B and C, respectively, according to the preferred embodiment of the invention.
Figure 4B:
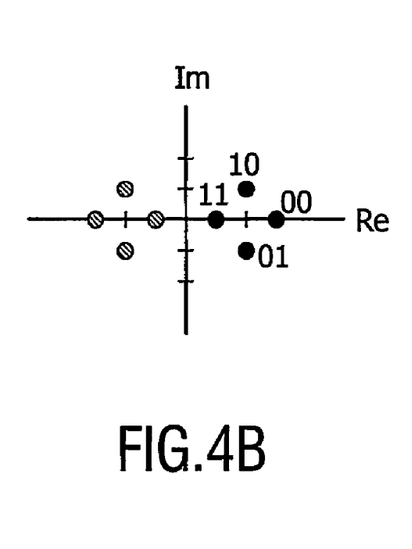
Figure 4C:
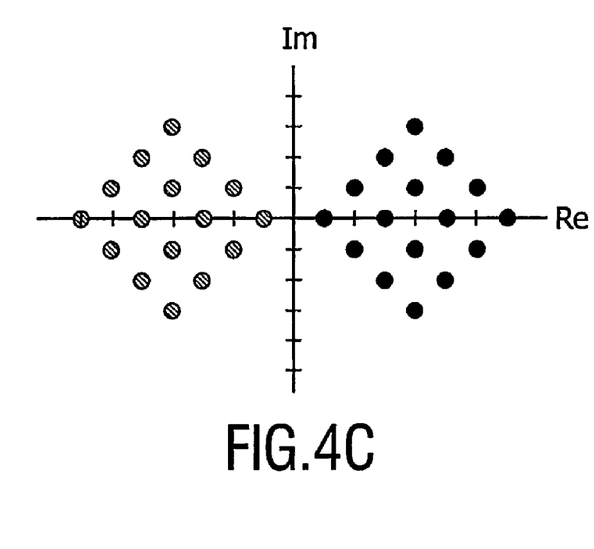

FIG. 4A to FIG. 4C show, as examples, three preferred embodiments of possible constellations for the new modulation for carrying the TPS signals and the new service. In each of FIG. 4A to FIG. 4C, the symbols of the added over-modulation are represented by the points in black and the new obtained modulation is constituted by both the points in black and the hatched ones. The sign of the real parts of the points of the new obtained modulations contain the TPS information bit. Many other constellations can be built, which meet the angle requirement as indicated in FIG. 3.

In FIG. 4A, a single information bit is used for carrying the new service on each TPS carrier. Each bit Yi of the new stream, with $Yi \in \{0, 1\}$, is carried by a point z, represented in black, of the constellation, with $z \in \{1+j.0,5, 1-j.0,5\}$. For example:

If z=1+j.0,5 then Yi=0
If z=1−j.0,5 then Yi=1

In FIG. 4B, a pair of information bits are used for the new service on each TPS carrier. Each pair of bits $Y0_1, Y1_1$ of the new stream with $Y0i, Y1_1 \in \{00, 01, 11, 10\}$, is carried by a point z, wherein $z \in \{n+jm\}$ of the constellation, with $z \in \{3+j.0, 2-j, 2+j, 1+j.0\}$. For example:

If z=3+j.0 then Y0i=0 and Y1i=0
If z=2−j then Y0i=0 and Y1i=1
If z=2+j then Y0i=1 and Y1i=0
If z=1+j.0 then Y0i=1 and Y1i=1

In FIG. 4C, the same principle is applied. Four bits are used for the new service on each TPS carrier. Each quartet of bits $Y0_1\ Y1_1\ Y2_1\ Y3_1$ of the new stream is carried by a point z, wherein $z \in \{n+jm\}$ of the constellation, with $z \in \{7+j.0, 6-j, 6+j, 5+j.0, 4-j.3, 5-j.2, 3-j.2, 4-j, 4+j.3, 3+2j, 5+j.2, 4+j, 1+j.0, 2+j, 2-j, 3+j.0\}$.

In all 3 examples, the average power of the TPS carriers must be identical to the one of the data carriers of the OFDM symbol. A regulation factor, denoted Fn, must be applied for all types of modulations. Table 1 shows examples of the regulation factors to be applied for each of the modulations A, B and C.

TABLE 1

| Type of modulation | Regulation factor |
|---|---|
| A | Fn = $1/\sqrt{(5/4)}$ |
| B | Fn = $1/\sqrt{5}$ |
| C | Fn = $1/\sqrt{21}$ |

Figure 5:
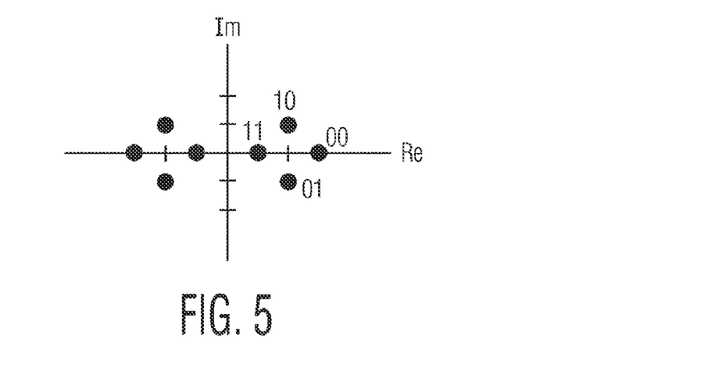
FIG. 5 is a schematic diagram illustrating the building of a new transmission signal according to the alternative B of the preferred embodiment.

FIG. 5 shows the building of the new modulation over the TPS carriers. The sign of the real part of the points of the new obtained modulation contains the TPS information bit. The new vector $C_{1,k}$ carried by the TPS carrier k over the OFDM symbol 1, is defined by:

$R\{C_{1,k}\} = Re\{Stps_{1,k}\}.Re\{Snew_i\}.Fn$ $Im\{C_{1,k}\} = Im\{Snew_i\}.Fn$ with:
  $Stps_{1,k}$ is the complex symbol of the DPSK modulated TPS stream with $Stps_{1,k} \in \{1+j.0, -1+j.0\}$,
  $Snew_i$ is the complex symbol of the new stream, modulated with any of the A, B or C over modulations with $Re\{Snew_i\} > 0$,
  Fn is the regulation factor.

Figure 6:
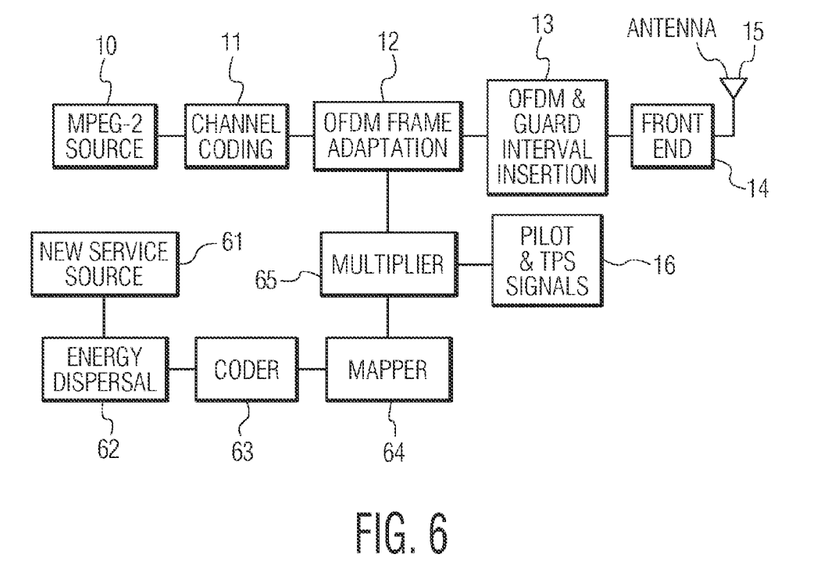
FIG. 6 is a schematic block diagram illustrating a transmission device according to the preferred embodiment of the invention.

FIG. 6 is a block diagram of a modified DVB-T transmission chain according to the invention. It shows how the new TPS stream is inserted into the DVB-T signal. In addition to the blocks of FIG. 1, it comprises:
  a new service source block 61 for providing the additional information data,
  an energy dispersal block 62 for mixing the information data with a random sequence,
  a coder block 63 and a mapper 64 for encoding and modulating the data to be transmitted in accordance with one of the suitable over modulations,
  a multiplier block 65 for multiplying the over modulated data containing the new service with the TPS and pilot signals before inserting the new stream into the DVB-T stream.

The number of bits that can be carried by this new modulation depends on the required liability of the new service. Table 2 below shows the rate (not encoded) of the new stream with respect to the chosen modulation.

TABLE 2

| | #bits carried by the over modulation | | | | |
|---|---|---|---|---|---|
| Kbits/sec | 1 A | 2 B | 3 | 4 C | 5 |
| 8K or 2K ¼ | 61 | 121 | 182 | 243 | 304 |
| 8K or 2K ⅛ | 67 | 135 | 202 | 270 | 337 |
| 8K or 2K ¹⁄₁₆ | 71 | 143 | 214 | 286 | 357 |
| 8K or 2K ¹⁄₃₂ | 74 | 147 | 221 | 294 | 368 |

Table 2 below shows that it is thus possible to add at least 61 Kbits over the more liable DVB-T mode and 368 Kbits over the least liable mode. This rate can be raised or diminished to the detriment of the homogeneity of the range of the main DVB-T stream. An error correction code can also be used to improve liability to the detriment of the rate.

This does not disturb the DVB-T reception. Only the demodulators that need it will be able to decode the new service. The over modulation does not disturb or affect the pilot carriers. Neither does it disturb or affect the data carriers of the DVB-T signal. The payload is thus not affected.

The DBPSK decoding is only slightly affected because the over modulation does not change its sign. The binary error probability Pb of the DBPSK is known. It is:

$Pb = \frac{1}{2}e^{-SNR}$ where:
  Pb is the bit error rate and
  SNR is the signal to noise ratio that measures the level of white Gaussian noise. In the case of the TPS signal of the DVB-T recommendation, each bit is repeated 17 times in the 2K mode and 68 times in the 8K mode. The 2K mode being the less robust, only the immunity of this mode needs to be checked. It amounts to:

$$Pb_{TPS-2K} = \frac{1}{2}e^{-17 \cdot SNR}$$

The rate of the TPS signal is equal to the rate of the OFDM symbols (1 bit by OFDM symbol), which sets the maximum rate for the 2K mode with a guard interval ¹⁄₃₂ to:

$$\text{TPSbit\_rate}_{2K-1/32} = \frac{1}{Ts_{2K-1/32}} = 231\ \mu s^{-1} = 4329\ bits/s$$

where Ts is the OFDM symbol time of table 5 of the cited recommendation.

To compare the level of noise needed to be able to properly decode the TPS signals with the one necessary for a good image quality, the QEF (quasi error free) quality criteria can be used, which corresponds to less than one error per hour. For example, in the table A.1 of the cited recommendation, the maximum SNR for the QEF in the more robust mode is 3.1 dB. The acceptable error rate on the TPS for QEF is then.:

$$Pb_{QEF} = \frac{1}{4329 * 3600} = 6.41 \cdot 10^{-8}$$

$$SNR_{TPS\_2K\_QEF} = 10 \cdot \log\left(\frac{\ln(2 \cdot 6.41 \cdot 10^{-8})}{-17}\right) = -0.3\ dB$$

It is to be noticed that the level of SNR of the TPS is 3.4 dB higher in the more robust mode of the DVB-T payload stream. This rate is very pessimistic because in general, the decoders only use the TPS during a very short period corresponding to the lock (acquisition) time.

Figure 7:
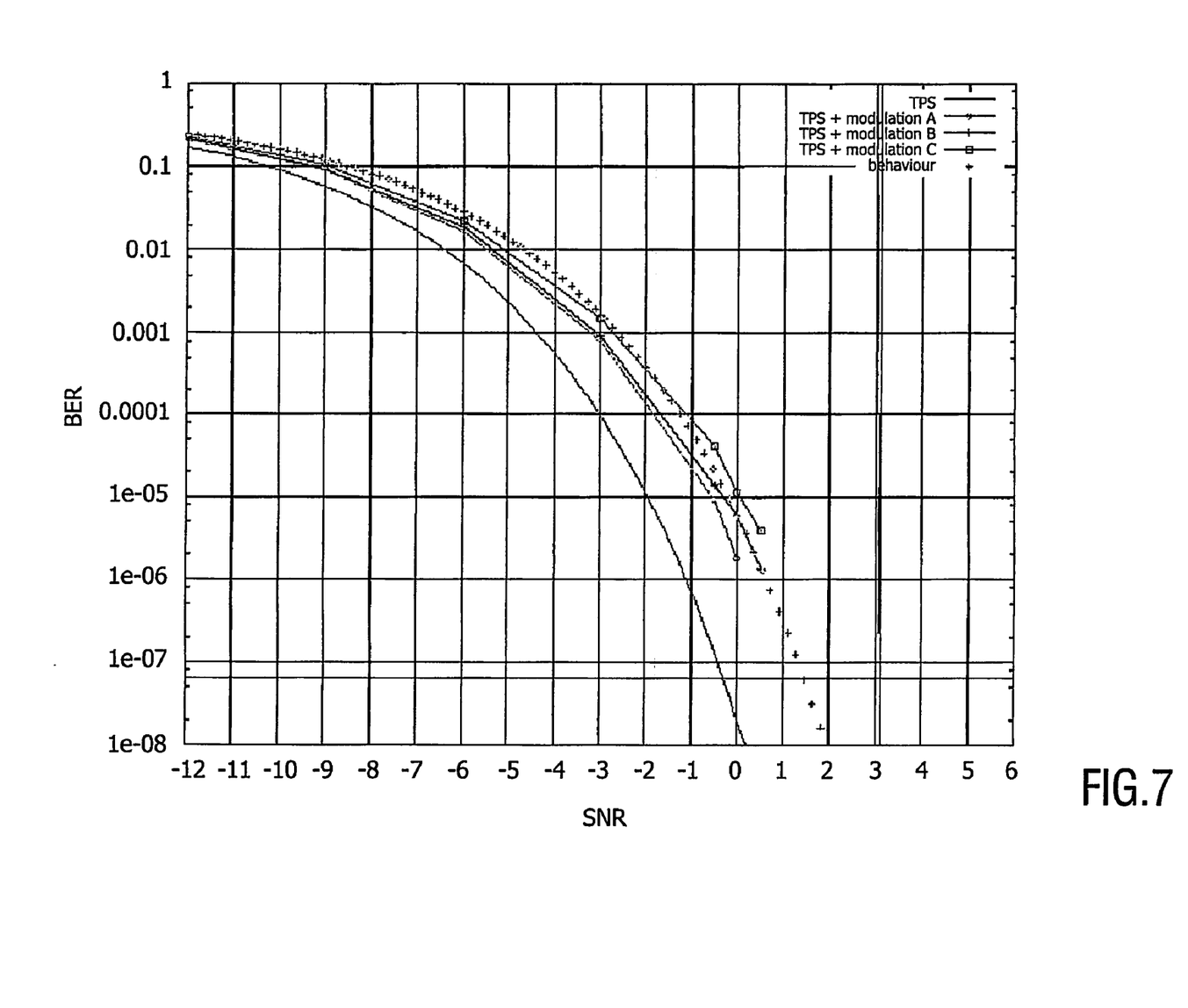
FIG. 7 is a curve illustrating the behavior of the new transmission signal for each over modulations A B and C compared with the behavior of the current transmission signal with respect to the bit error rate BER and the signal to noise ratio SNR according to the preferred embodiment of the invention.

FIG. 7 shows the behavior of the new built streams for each over modulations A B and C compared with the behavior of the current TPS stream with respect to the BER (vertical axis) and SNR (horizontal axis). The two limits constituted by the BER of $6.4 \cdot 10^{-8}$ and the SNR of 3.1 dB are indicated with bold horizontal and vertical lines, respectively. FIG. 7 shows that the over modulations can then be considered not to affect the TPS signal because for the maximum level of noise, which is tolerated by the MPEG-2 stream, the BER on the TPS stream remains below the QEF.

Depending on the chosen new over modulation, coherent demodulation can be realized in a similar way as for the data of the main DVB stream. This is illustrated in FIG. 8 to FIG. 10.

Figure 8:
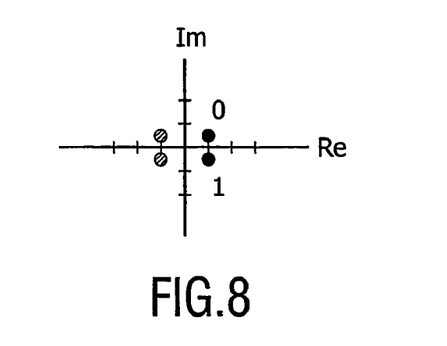
FIG. 8 is a schematic diagram illustrating a method of de-mapping the received signals modulated according to the over modulation A.

FIG. 8 illustrates an example of a method for de-mapping the type A over modulation. The following rule applies, R being the complex symbol received demodulated, represented in FIG. 8 by a point of a constellation, and $Y_1$ being the binary symbol $\{0, 1\}$ to generate:

if $Im\{R\} > 0$ then $Y_1 = 0$ else $Y_1 = 1$.

Figure 9A:
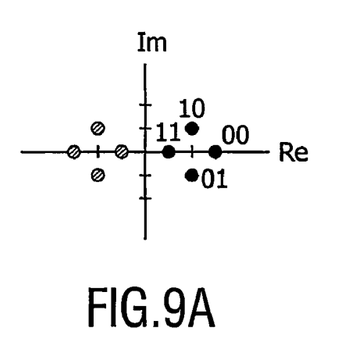
FIG. 9A to FIG. 9C are schematic diagrams illustrating a method of de-mapping the received signals modulated according to the over modulation B.
Figure 9B:
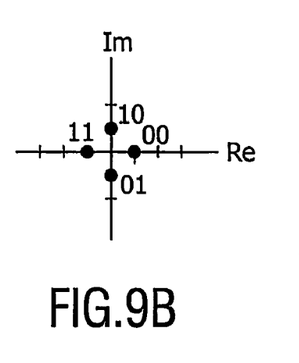
Figure 9C:
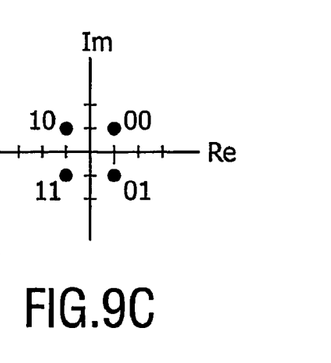
Figure 10A:
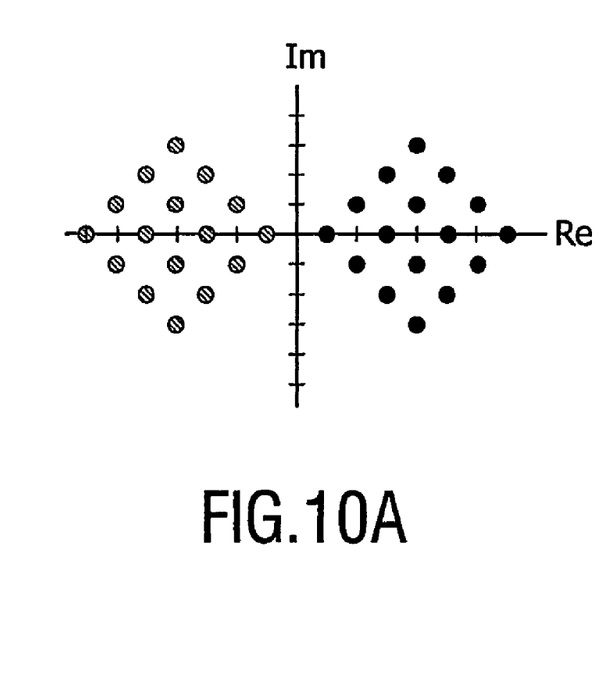
FIG. 10A to FIG. 10C are schematic diagrams illustrating a method of de-mapping the received signals modulated according to the over modulation C.
Figure 10B:
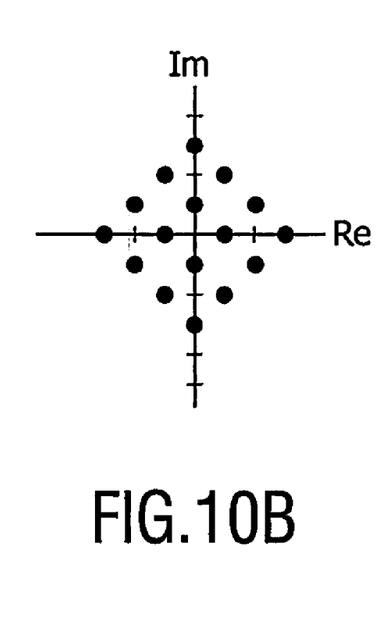
Figure 10C:
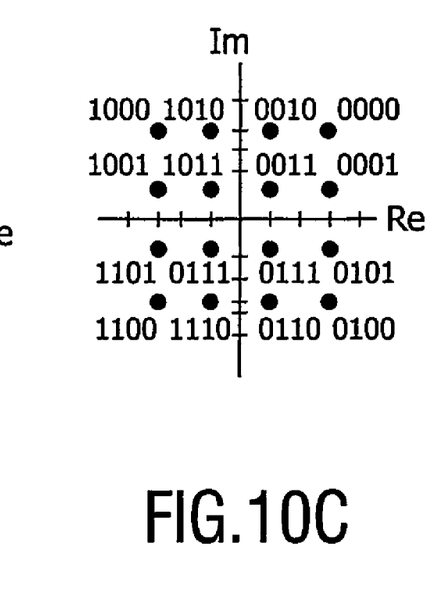

FIG. 9A to FIG. 9C show an example of a method for de-mapping the type B over modulation for a given carrier of symbol 1, wherein $R_1$ is the complex Symbol received demodulated and $Y0_1$, $Y1_1$ is the pair to generate among 4 ($2^2 = 4$) possible pairs $\{00, 01, 11, 10\}$. It is possible to match the over modulation B with the classical QPSK modulation of the DVB-T data as described in table 9a of the cited recommendation and to demodulate the new TPS stream the same way as for the QPSK demodulation of the DVB-T stream. Same hardware can then be used. To this end, the symbol $S_1$ received and demodulated can be transformed by translation and rotation into the symbol $S_1'$:

$Re\{S_1'\} = |Re\{S_1\}| - 2 - Im\{S_1\}$
$Im\{S_1'\} = |Re\{S_1\}| - 2 + Im\{S_1\}$
if $Re\{S_1'\} > 0$ then $Y0_1 = 0$ else $Y0_1 = 1$.
if $Im\{S_1'\} > 0$ then $Y1_1 = 0$ else $Y1_1 = 1$.

FIG. 10A to FIG. 10C show an example of a method for de-mapping the type C over modulation. The same principle as for modulation B is applied wherein $S_1$ is the complex Symbol received demodulated, $S_1'$, is the symbol obtained by translation and rotation of symbol $S_1$ and $Y0_1$, $Y1_1$, $Y2_1$ and $Y3_1$ is the quartet to generate among 16 ($2^4 = 16$) possible quartets $\{0000, 0001, 0010, 0010, 0111, 0101, 0110, 0100, 1101, 0111, 1100, 1110, 1000, 1010, 1001, 1011\}$:

$Re\{S_1'\} = |Re\{S_1\}| - 4 - Im\{S_1\}$
$Im\{S_1'\} = |Re\{S_1\}| - 4 + Im\{S_1\}$

Then:
if $Re\{S_1'\} > 0$ then $Y0_1 = 0$ else $Y0_1 = 1$.
if $Im\{S_1'\} > 0$ then $Y1_1 = 0$ else $Y1_1 = 1$.
if $Re\{S_1'\} > 2$ then $Y2_1 = 0$ else $Y2_1 = 1$.
if $Im\{S_1'\} > 2$ then $Y3_1 = 0$ else $Y3_1 = 1$.

Then the new (TPS) sub-stream can be demodulated like a 16-QAM DVB-T stream.

The invention claimed is:

1. A multi-carrier transmission system for transmitting information signals over a set of carriers, the set of carriers comprising a sub-set of carriers, denoted sub-carriers, and modulating each sub-carrier according to a modulation, comprising:
a mapper configured to modulate each sub-carrier using a first constellation to convey additional information signals; and
a signal block configured to modulate each sub-carrier using a second constellation to convey parameter signaling signals,
wherein the real parts of complex symbols of the modulation are proportional to a combination of the real parts of complex symbols of the first constellation with the real parts of complex symbols of the second constellation, the complex parts of the complex symbols of the modulation being proportional to the complex parts of the complex symbols of the first constellation.

2. A system as claimed in claim 1, wherein said second constellation is of the type DBPSK and wherein couple of symbols of the first constellation makes an angle, which is smaller than 90 degrees.

3. A system as claimed in claim 2, wherein said sub-carriers are the DBPSK modulated TPS carriers of the DVB-T transmission system.

4. A system as claimed in claim 3, wherein the complex symbols, denoted z, of said first constellation are defined by $z \in \{1+j.0.5, 1-j.0.5\}$ or $z \in \{3+j.0, 2-j, 2+j, 1+j.0\}$ or $z \in \{7+j.0, 6-j, 6+j, 5+j.0, 4-j.3, 5-j.2, 3-j.2, 4-j, 4+j.3, 3+j.2, 5+j.2, 4+j, 1+j.0, 2+j, 2-j, 3+j\}$.

5. A system as claimed in claim 1, wherein the indexes of the sub-carriers in the sub-set of carriers vary with time.

6. A multi-carrier transmission method for transmitting information signals over a set of carriers, the set of carriers comprising a sub-set of carriers, denoted sub-carriers and modulating each sub-carrier according to a modulation, comprising:
modulating each sub-carrier using a first constellation to convey additional information signals at a multi-carrier transmission system; and
modulating each sub-carrier using a second constellation to convey parameter signaling signals at the multi-carrier transmission system,
wherein the real parts of complex symbols of the modulation are proportional to a combination of the real parts of complex symbols of the first constellation with the real parts of complex symbols of the second constellation, the complex parts of the complex symbols of the modulation being proportional to the complex parts of the complex symbols of the first constellation.

7. A computer program product for a device computing a set of instructions, which when loaded into the device, causes said device to carry out the method as claimed in claim 6.

8. A system as claimed in claim 1, wherein the real parts of the complex symbols of the modulation are equal to the product of the real parts of the complex symbols of the first constellation, the real parts of the complex symbols of the second constellation and a regulation factor.

9. A system as claimed in claim 8, wherein the regulation factor is determined by the modulation.

10. A system as claimed in claim 1, wherein the complex parts of the complex symbols of the modulation are equal to the product of the complex parts of the complex symbols of the first constellation and a regulation factor.

11. A system as claimed in claim 10, wherein the regulation factor is determined by the modulation.

* * * * *